UNITED STATES PATENT OFFICE.

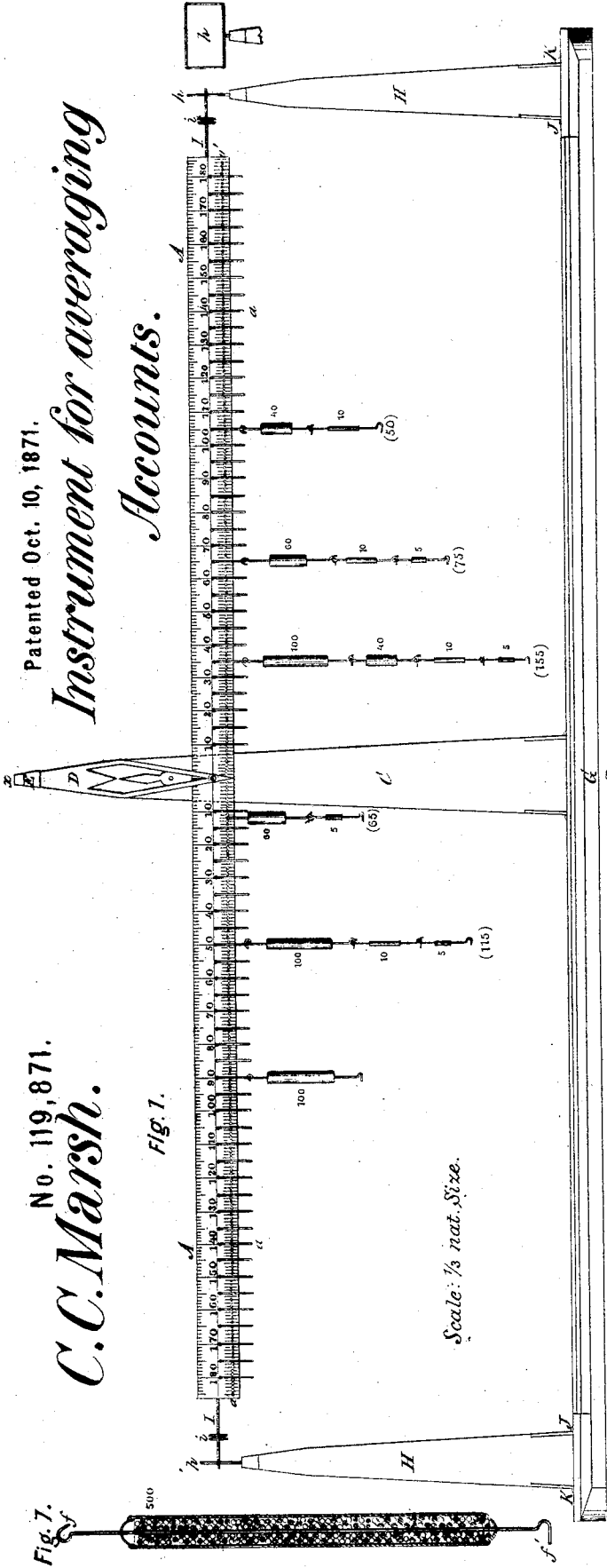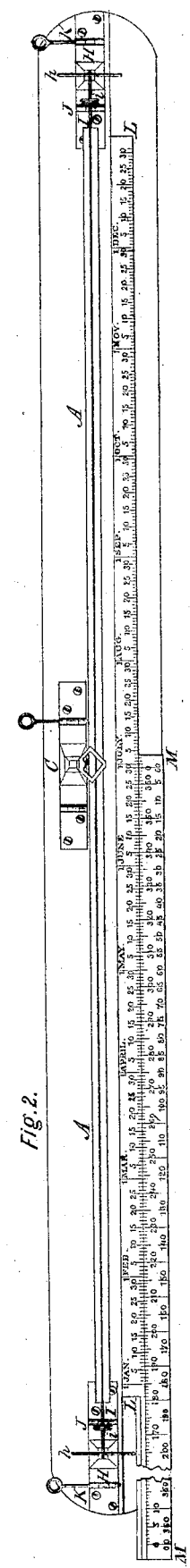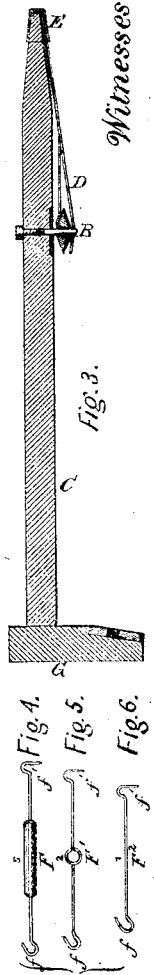

CHRISTOPHER C. MARSH, OF NEW YORK, N. Y.

IMPROVEMENT IN BALANCES.

Specification forming part of Letters Patent No. 119,871, dated October 10, 1871.

*To all whom it may concern:*

Be it known that I, CHRISTOPHER C. MARSH, of the city, county, and State of New York, have invented a new and useful Instrument for Averaging Commercial and other Accounts.

The subject of this invention is an instrument consisting of a scale-beam, supported in a suitable frame-work, and employed in connection with a system or series of weights, graduated to represent relative values, the beam being graduated to represent periods for which interest is to be charged or at which payments may become due. The apparatus may be used for calculating averages generally, equations of payments, and more particularly for averaging commercial accounts, showing at what date the total of such accounts or the balance may be due, and it will in all cases give the result with mathematical and perfect accuracy.

Figure 1 is a front view of the apparatus as it is used in operation. Fig. 2 is a plan thereof. Fig. 3 is a transverse section thereof on the line $x\,x$. Figs. 4, 5, and 6 are perspective views of the three smallest denominations of weights. Fig. 7 is a section of one of the largest denomination.

A is a beam, supported at its midlength by a metallic sleeve or bushing, fitted within the said beam and resting upon the knife-edge of a horizontal pivot, B, which is inserted within an aperture in the upper part of the standard C, and is permanently secured at its outer end in a hanger, D, the upper end of which is hooked to catch over the top of the said standard, and is confined therein by a cap, E. The beam is graduated from the center in each direction toward its ends, and is preferably divided into three hundred and sixty-six parts, making one hundred and eighty-three at each end, each representing one day, so that either end of the beam may be made to extend through one-half year, allowing one division for each day, as will be hereinafter explained. $a\,a$ represent loops or links suspended from the bottom at regular distances, and each a little distance below its transverse or vertical center, so that any weight hung to the said loops having its point of suspension below the pivot B, upon which the beam rests, may have no tendency to put the said beam out of a vertical plane.

In practice I employ one of these loops for each five divisions indicating days in the length of the beam, and for each separate division I employ a perforation, $a'$, which passes through the beam at a point near its lower edge. Each of these loops and perforations is adapted to receive any necessary weight in using the invention. $F\ F^1\ F^2$ represent weights of different values, each of which is formed with a hook, $f$, at one end to catch in the loops $a$, and at the other end with a pin or projection, $f'$, to insert in the apertures $a'$. At the ends of the base G, to which the central standard C is attached, are standards H, each provided at its upper end with a yoke or loop, $h$, to receive pins or wires I, which project rigidly from the outer end of the beam, and by means of the yokes $h$ are made to prevent its too great deflection in either direction. Upon the horizontal pins I are graduated weights $i$, working on screw-threads, and adapted to accurately poise the beam in customary manner. Each of the standards H H is secured to the base G by means of a hinge, J, at one edge of the said standard, and a pin, K, at the other edge, so that they may be held firmly in position while in use, but may be conveniently folded down upon the standard to bring the apparatus into more compact shape when it is to be conveyed from place to place.

For convenience in using my apparatus I provide upon its base a compound adjustable scale, L M, the part L of which is stationary, and is marked with months and days, as represented, while the sliding part M is marked in consecutive days from each end. By this means I am able, by adjusting the scale M relatively to the scale L, to ascertain in an instant the number of days between any two given dates.

The weights are preferably made with wires extending from end to end, and the hooks at their respective ends adapt any number of them to be hung one to another, or upon any one of the loops $a$ in the beam. For the heavier weights I employ metallic cases fixed upon the said wires, and supplied with shot or any other heavy matter, which may be secured therein by a simple cap. The weights are graduated proportionately to one another, so that, for example, the lightest ones may represent each the value of $1, the next $2, the next $5, the next $10, the next $20, the next $40, the next $60, the next $100, the next $200, the next $500, and so on in any larger amounts; or, as the values of the weights are relative, the same series may be used to represent $5, $10, $25, $50, $100, $200, $300, $500, $1000, $2500, &c.; or they may be graduated on the same principle in any other manner.

In practice I prefer to employ, for convenience, two denominations of weights, representing from the unit $1 to $500, or from $5 to $2500, or from $10 to $2500, as the person using the scale may elect.

The modes of using the apparatus are various. For illustration, I will describe simply the mode of equating an account. Any convenient date, as the 30th of June, may be assumed for the date of balancing the account. This date will often be found convenient as allowing a margin of about one hundred and eighty days on either side of the center, to include the whole of any particular year. Let us suppose that the following transactions are shown by the ledger or account-book:

| Dr. | Cr. |
|---|---|
| $100 due April 1. | $50 paid March 17. |
| 115 due May 11. | 75 paid April 26. |
| 65 due June 18. | | and assume June 30 as the date for balancing the account. Let the left-hand end of the beam represent the debtor and the right-hand the creditor side. In this case the weights corresponding to the amounts $100, $115, and $65 are suspended respectively at the distances 90, 50, and 12, indicating the length of time they will have been due on the 30th of June, to the left of the center of the beam. The amounts $75 and $50 are in like manner suspended from the points 65 and 105 on the right of the beam center, these being the number of days each was paid previous to June 30. The difference between the debit and credit sides is shown by simple subtraction to be $155. Taking the weight's equivalent to this, we find that it must be placed at the point 35 on the right of the beam in order to poise the debtor side, hence the balance must be paid thirty-five days previous to the 30th of June, in order that neither party may be liable for interest—that is, on the 26th of May; or, if the balance of $155 be not actually paid until June 30, accruing interest for thirty-five days will be due thereon.

If May 26 be assumed in the above example as the central point from which to reckon, it will be found, by placing the respective weights at their proper positions on the beam, that the two sides will precisely balance each other.

I claim as my invention—

The combination of the beam A, adapted for the reception of the weights F, the hanger D secured removably to the standard by means of the cap E, and the pivot B fixed in the hanger D and passing through an aperture in the beam, the whole being constructed and adapted, as herein described, to constitute an instrument for averaging commercial and other accounts.

CHRIST. C. MARSH.

Witnesses:
OCTAVIUS KNIGHT,
WALTER ALLEN.